Patented Aug. 22, 1944

2,356,170

UNITED STATES PATENT OFFICE 2,356,170

ACCELERATION OF VULCANIZATION

Roger A. Mathes, Akron, and Paul C. Jones, Silver Lake, Ohio, assignors to The B. F. Goodrich Company, New York, N. Y., a corporation of New York No Drawing. Application October 21, 1941, Serial No. 415,944

14 Claims. (Cl. 260—795)

This invention relates to the vulcanization of rubber and pertains specifically to the acceleration of vulcanization in the presence of an amino alkyl sulfide.

The term "amino alkyl sulfide" includes the amino alkyl hydrosulfides (or mercaptans) as well as the diamino dialkyl monosulfides and polysulfides containing no more than four sulfur atoms. The amino group may have its hydrogen atoms replaced by aliphatic hydrocarbon groups, such as methyl, ethyl, etc. The alkyl chain between the sulfur and nitrogen atoms may contain no more than three carbon atoms, although it may have a hydrocarbon side-chain such as methyl, ethyl, butyl, phenyl, etc.

Among the compounds included in the class of my new accelerators art 1,1'-di-aminodimethyl mono-, di-, or tetrasulfide; 2,2'-diaminodiethyl mono-, di-, or tetrasulfide; 2,2'-diaminodi-n-propyl mono-, di-, or tetrasulfide; 2,2'-diethyl-3,3'-diaminodi-n-propyl mono-, di-, or tetrasulfide; 2,2' - diphenyl-3,3'-diaminodi-n-propyl mono-, di-, or tetrasulfide; 3,3'-diaminodi-n-propyl mono-, di-, or tetrasulfide; N,N'-dimethyl-2,2'-diaminodiethyl mono-, di-, or tetrasulfide; N,N'-dimethyl-N,N'-diethyl-2,2'-diaminodi-n-propyl mono-, di-, or tetrasulfide; aminomethyl mercaptan; 2-aminoethyl mercaptan; 2-amino-n-propyl mercaptan; N,N-dimethyl-2-amino-n-propyl mercaptan; N-ethyl-3-amino-n-propyl mercaptan; N - methyl-N-ethyl - 2-aminoethyl mercaptan; 2-phenyl-3-amino-n-propyl mercaptan; and other similar compounds.

Our new accelerators may be prepared by methods disclosed in the chemical literature. For example, ethylene imine may be reacted with hydrogen sulfide to give 2,2'-diaminodiethylsulfide. The reaction between an aminoalkylsulfuric acid, alkali, and sodium sulfide or polysulfide may also be used for their preparation.

As a specific example of the synthesis of these compounds, we have prepared 2,2'-diaminodiethyltetrasulfide by refluxing together 120 parts by weight of $Na_2S \cdot 9H_2O$, 40 parts of NaOH, 48 parts of sulfur, 141 parts of 2-aminoethylsulfuric acid, and 200 parts of water. After three hours the product is washed with water by decantation several times, and dried under vacuum at about 60° to 80° C. The yield is about 72 parts of a soft red-brown resin which is insoluble in most organic solvents, including carbon disulfide, and only slightly soluble in water.

As an indication of the vulcanization accelerating properties of our new compounds, we have prepared the following rubber composition, in which the parts are by weight:

Rubber _____ 100
Zinc oxide_____ 5
Sulfur _____ 3
Accelerator _____ 1

In the following table are given the ultimate tensile strength (T) in pounds per sq. inch, and ultimate elongation (E) in per cent, of samples of the foregoing composition vulcanized for varying lengths of time at 287° F. Sample A contains 2,2'-diaminodiethylmonosulfide; B contains 2-aminoethyl mercaptan; C contains 2,2'-diaminodiethyldisulfide; D contains 2,2' - diaminodiethyltetrasulfide.

| Cure in min. | A | | B | | C | | D | |
|---|---|---|---|---|---|---|---|---|
| | T | E | T | E | T | E | T | E |
| 15 | 2,980 | 825 | 2,950 | 895 | 2,600 | 920 | 2,480 | 915 |
| 30 | 3,330 | 815 | 3,260 | 830 | 2,890 | 920 | 2,980 | 890 |
| 60 | 3,180 | 815 | 3,580 | 810 | 3,010 | 870 | 3,210 | 835 |

It is apparent from these results that our new compounds are very effective accelerators, producing rubber stocks with high tensile strength under the usual vulcanization conditions.

Although it is unnecessary to use a fatty acid with these new accelerators, fatty acids or their metal salts may be present without harmful effects. Indeed, in the case of the polysulfides, especially the tetrasulfide, it is not necessary to add free sulfur to the rubber composition inasmuch as the accelerator itself may liberate sufficient sulfur to act as a vulcanizing agent. Any of the usual pigments, dyes, fillers, antioxidants, accelerators, etc., in use in the rubber industry may be employed in conjunction with our new accelerators without harmful effects. Although very small amounts of our accelerators produce noticeable effects upon the properties of rubber compositions, we prefer to use from about 0.5% to 5% or more. These new accelerators are effective with any kind of rubber, such as caoutchouc, balata, gutta percha, latex, artificial rubber isomers, and synthetic rubbers which will vulcanize with sulfur, such as the copolymers of conjugated diene hydrocarbons with other copolymerizable monomers, e. g., copolymers of butadiene with either acrylonitrile, styrene, methyl acrylate, methyl methacrylate and the like. The generic term "a rubber" is accordingly used in the claims to designate all these like materials.

Rubber stocks containing our new accelerators may be vulcanized by any of the usual methods, such as heating in a mold, in hot water, steam, hot air, etc. These stocks are not limited in their use but are applicable to a wide variety of products such as pneumatic and solid tires, belts, hose, footwear, latex dipped goods, surgical goods, all kinds of molded products, and the like.

Although specific examples of our invention have been herein disclosed, the appended claims are not limited thereto, but are intended to embrace all the obvious equivalents.

We claim:

1. The process which comprises vulcanizing a rubber in the presence of an aminoalkyl sulfide which contains no more than four sulfur atoms, and no more than three carbon atoms in the alkyl chain between the sulfur and nitrogen atoms, said aminoalkyl group containing no substituent groups other than hydrogen and aliphatic hydrocarbon groups.

2. The process which comprises vulcanizing a rubber in the presence of an aminoalkyl mercaptan which contains no more than three carbon atoms in the alkyl chain between the sulfur and nitrogen atoms, said aminoalkyl group containing no substituent groups other than hydrogen and aliphatic hydrocarbon groups.

3. The process which comprises vulcanizing a rubber in the presence of a di(aminoalkyl) monosulfide which contains no more than three carbon atoms in the alkyl chain between the sulfur and nitrogen atoms, said aminoalkyl group containing no substituent groups other than hydrogen and aliphatic hydrocarbon groups.

4. The process which comprises vulcanizing a rubber in the presence of a di(aminoalkyl) polysulfide which contains no more than four sulfur atoms and no more than three carbon atoms in the alkyl chain between the sulfur and nitrogen atoms, said aminoalkyl group containing no substituent groups other than hydrogen and aliphatic hydrocarbon groups.

5. The process which comprises vulcanizing a rubber in the presence of 2-aminoethyl mercaptan.

6. The process of vulcanizing a rubber in the presence of 2,2'-diaminodiethyl monosulfide.

7. The process which comprises vulcanizing a rubber in the presence of 2,2'-diaminodiethyl disulfide.

8. A composition comprising a rubber vulcanized in the presence of an aminoalkyl sulfide which contains no more than four sulfur atoms, and no more than three carbon atoms in the alkyl chain between the sulfur and nitrogen atoms, said aminoalkyl group containing no substituent groups other than hydrogen and aliphatic hydrocarbon groups.

9. A composition comprising a rubber vulcanized in the presence of an amino alkyl mercaptan which contains no more than three carbon atoms in the alkyl chain between the sulfur and nitrogen atoms, said aminoalkyl group containing no substituent groups other than hydrogen and aliphatic hydrocarbon groups.

10. A composition comprising a rubber vulcanized in the presence of a di(aminoalkyl) monosulfide which contains no more than three carbon atoms in the alkyl chain between the sulfur and nitrogen atoms, said aminoalkyl group containing no substituent groups other than hydrogen and aliphatic hydrocarbon groups.

11. A composition comprising a rubber vulcanized in the presence of a di(aminoalkyl) polysulfide which contains no more than four sulphur atoms and no more than three carbon atoms in the alkyl chain between the sulfur and nitrogen atoms, said aminoalkyl group containing no substituent groups other than hydrogen and aliphatic hydrocarbon groups.

12. A composition comprising a rubber vulcanized in the presence of 2-aminoethyl mercaptan.

13. A composition comprising a rubber vulcanized in the presence of 2,2'-diaminodiethyl monosulfide.

14. A composition comprising a rubber vulcanized in the presence of 2,2'-diaminodiethyl disulfide.

ROGER A. MATHES.
PAUL C. JONES.